US008805459B2

(12) United States Patent
Pohlabeln et al.

(10) Patent No.: US 8,805,459 B2
(45) Date of Patent: Aug. 12, 2014

(54) COMMUNICATION DEVICE COMPRISING TWO OR MORE ANTENNAS

(75) Inventors: Werner Pohlabeln, Igensdorf (DE); Werner Feilner, Lauf a.d. Pegnitz (DE); Dirk Matuszczak, Sindelfingen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 52 days.

(21) Appl. No.: 13/643,354

(22) PCT Filed: Apr. 28, 2010

(86) PCT No.: PCT/EP2010/055737
§ 371 (c)(1), (2), (4) Date: Dec. 4, 2012

(87) PCT Pub. No.: WO2011/134511
PCT Pub. Date: Nov. 3, 2011

(65) Prior Publication Data
US 2013/0178181 A1 Jul. 11, 2013

(51) Int. Cl.

| | |
|---|---|
| ***H04M 1/00*** | (2006.01) |
| ***H01Q 3/02*** | (2006.01) |
| ***H01Q 1/24*** | (2006.01) |
| ***H01Q 21/28*** | (2006.01) |

(52) U.S. Cl.
CPC ................. *H01Q 3/02* (2013.01); *H01Q 1/242* (2013.01); *H01Q 21/28* (2013.01)
USPC .................................... 455/575.1; 455/575.7

(58) Field of Classification Search
CPC ......... H01Q 1/103; H01Q 1/244; H01Q 3/02; H01Q 5/0079; H01Q 7/02
USPC ....................................................... 455/575.7
See application file for complete search history.

(56) References Cited

U.S. PATENT DOCUMENTS

| | | | | |
|---|---|---|---|---|
| 5,281,970 | A * | 1/1994 | Blaese | 341/176 |
| 5,440,317 | A * | 8/1995 | Jalloul et al. | 343/791 |
| 5,818,392 | A * | 10/1998 | Oka et al. | 343/702 |
| 5,940,040 | A * | 8/1999 | Koyanagi et al. | 343/702 |
| 6,006,117 | A * | 12/1999 | Hageltorn et al. | 455/575.7 |
| 6,137,445 | A * | 10/2000 | Ha et al. | 343/702 |
| 6,362,793 | B1 * | 3/2002 | Sawamura et al. | 343/702 |
| 6,469,669 | B1 * | 10/2002 | Tran | 343/702 |
| 6,662,021 | B2 * | 12/2003 | Kang et al. | 455/553.1 |
| 6,812,897 | B2 * | 11/2004 | Jarmuszewski et al. | 343/702 |
| 6,885,346 | B2 * | 4/2005 | Ha et al. | 343/702 |
| 2002/0118135 | A1 * | 8/2002 | Johnson et al. | 343/702 |
| 2005/0239416 | A1 | 10/2005 | Shimizu | |
| 2009/0109113 | A1 | 4/2009 | Crohas | |
| 2009/0207092 | A1 * | 8/2009 | Nysen et al. | 343/876 |

FOREIGN PATENT DOCUMENTS

| | | | |
|---|---|---|---|
| WO | 2005029641 | A1 | 3/2005 |
| WO | 2009034647 | A1 | 3/2009 |

OTHER PUBLICATIONS

International Search Report mailed Feb. 16, 2011 in re: PCT/EP2010/055737; pp. 1-3 pgs.

* cited by examiner

*Primary Examiner* — Simon Nguyen
(74) *Attorney, Agent, or Firm* — Coats & Bennett, P.L.L.C.

(57) ABSTRACT

The present invention provides an electronic device adapted for performing a wireless communication for a transmission of data. The device comprises at least a first antenna having a first antenna feed point and a second antenna having a second antenna feed point, The antennas are adapted to transmit and receive electromagnetic signals for providing the wireless communication using a multiple antenna communication scheme.

16 Claims, 14 Drawing Sheets

COMMUNICATION DEVICE COMPRISING TWO OR MORE ANTENNAS

TECHNICAL FIELD

The present invention relates to an electronic device adapted to perform a wireless communication for a transmission of data comprising at least two antennas and to a method of extending an antenna of an electronic device.

BACKGROUND

There are several wireless diversity schemes that are capable of improving quality and reliability of a wireless link. As an example, there is often not a clear line of sight between a transmitter and a receiver in a wireless communication system. Especially in indoor and urban environments, the electro-magnetic signal emitted by a transmitting antenna is reflected along multiple paths (multipath propagation) before it is finally picked up at the receiver. Each reflection can introduce phase shifts, time delays, attenuations and even distortions and the reflections can destructively interfere with the signal itself at the aperture of a receiving antenna. The signal that is picked up by the receiving antenna can thus suffer from a loss in signal strength or quality and interference from reflected signals or signals emitted by other transmitters.

To overcome these problems, antenna diversity schemes are known that use two or more antennas to improve reception or transmission. This can be achieved as the same signal is observed by multiple antennas, each experiencing a different interference environment. While one antenna may experience destructive interference, the other may experience constructed interference, as a consequence of which a robust wireless link can be established. Further, multiple antennas can extract more energy from the electromagnetic field resulting in increased signal strength.

A particular implementation of antenna diversity is MIMO (Multiple Input and Multiple Output), which uses multiple antennas both at the transmitter and the receiver. Using a corresponding communication scheme, the capacity of a wireless communication system can be improved, in particular data throughput, by making use of spatial multiplexing. With this scheme, different data streams are transmitted from different transmit antennas in the same frequency channel. Due to their different spatial signatures, the data streams can be separated at the (at least two) receiving antennas, effectively enabling the transmission of data streams on separate spatial channels at the same frequency. Data throughput can accordingly be increased.

In order to realize the advantages provided by an antenna diversity scheme, a certain distance is required between the antennas of the sending/receiving device. For example in the spatial multiplexing scheme, the receiver needs to separate the signals arriving with different spatial signatures in order to be capable of separating the data streams.

However, space is often a critical issue, in particular for portable devices. In order to separate the antennas by the required distance, the housing of the device needs to have a relatively large dimension, especially when operating at low frequencies. Generally, the housing required to provide the appropriate distance will be larger than required by the electrical circuits enclosed therein.

It is thus desirable to enable the implementation of a antenna diversity scheme, such as spatial diversity or spatial multiplexing, also in small devices. It is further desirable that the two or more antennas of such a device will deliver uncorrelated signals. It is further desirable to adapt the signal reception/transmission by the two or more antennas to the current reception/transmission conditions, such as frequency band, signal strength or quality, data rate, environmental conditions, e.g. the signal paths and the like.

Accordingly, it is an object of the present invention to obviate at least some of the above disadvantages and to provide an improved electronic device configured to enable a multiple antenna communication scheme.

SUMMARY

According to an aspect of the invention, an electronic device adapted to perform a wireless communication for a transmission of data is provided. The electronic device comprises at least a first antenna having a first antenna feed point and a second antenna having a second antenna feed point, the first and second antennas being connected to the electronic device by the first and second antenna feed points, respectively. The antennas are adapted to transmit and receive electromagnetic signals for providing the wireless communication using a multiple antenna communication scheme that is based on multiple spatial transmission paths. The electronic device further comprises an extension mechanism to which at least the first antenna is mounted, the extension mechanism having a retracted position and at least one extended position, wherein in the extended position, the distance between the first antenna feed point and the second antenna feed point is larger than in the retracted position.

With the extension mechanism, the distance between the two feed points may thus be enlarged, which can improve the implementation of an antenna diversity scheme in the electronic device. In particular, by increasing the spatial separation of the antennas, the received signal strength and interference cancellation may be improved and spatial multiplexing may be enabled. The quality, reliability and/or data throughput of a wireless link established by the electronic device may thus be improved. Further, when transmitting signals by these antennas, the difference of the spatial signatures of these signals may be increased, so that a separation of these signals at a receiver is enabled or enhanced.

According to an embodiment, the second antenna can be mounted to said extension mechanism, to a second extension mechanism or to a housing of the electronic device. The second antenna feed point may thus be fixed relative to the housing or may be further separated from the housing by an extension mechanism, thus further increasing the feed point separation.

The extension mechanism may comprise a movable component having a portion towards which the first antenna is mounted. The extension mechanism may be adapted so that in the retracted position, the movable component is located in position in which the portion is arranged adjacent to or inside a housing of the electronic device, and so that in the extended position, said movable component is located in a position in which said portion is arranged in a larger distance to the housing than in the retracted position. Operating the movable component can thus increase the distance between the antenna feed points.

In the extended position, the distance between the first and second antenna feed points may be larger than the largest dimension of the housing of the electronic device. The extendable part of the extension mechanism may thus not be considered part of the housing.

In the extended position, the distance between the first and the second antenna feed points may for example be larger than 5 cm, or even larger than 7.5 cm. In particular, it may be at least a quarter of the wavelength at which the wireless communication is performed by means of said first and second antennas. Such a separation may enable the reception and transmission of signals on different spatial transmission paths and decrease the correlation of the signals.

The first antenna may be pivotably mounted to the extension mechanism. It may thus be directed or aimed as desired to improve reception or transmission. It is also possible to arrange the antenna inside a moveable component of the extension mechanism. A compact arrangement can thus be achieved.

According to an embodiment, the extension mechanism comprises a pivotable arm that is rotatably connected to the housing of the electronic device with a pivot point of said rotatable connection located in a first portion of the pivotable arm. The pivotable arm is movable by rotation around the pivot point to bring the extension mechanism from the retracted position into the extended position, the pivotable arm having a second portion towards which the first antenna is mounted and which is located at an opposing end of the pivotable arm in relation to the first portion. In the retracted position of the extension mechanism, the pivotable arm is located adjacent to the housing. In the extended position of the extension mechanism, the pivotable arm projects from the contour of the housing. In this position, the second portion and accordingly the feed point of the first antenna are arranged distant from the housing. This example can provide an easy to implement extension mechanism that is robust and cost efficient.

In another embodiment, the extension mechanism comprises a sliding element that is slidably arranged in a recess provided in the housing of the electronic device, wherein in the retracted position of the extension mechanism, the sliding element is substantially arranged inside the housing, and wherein in the extended position of the extension mechanism, the sliding element projects from the contour of the housing. The first antenna may be mounted to a portion of the sliding element that is, in the extended position, distant to the housing. It is also possible to arrange the first antenna and the first antenna feed point inside the sliding element. A compact size of the electronic device can thus be achieved in the retracted position.

According to another embodiment, the extension mechanism may comprise a flap pivotably connected to a housing of the electronic device. In the retracted position of the extension mechanism, the flap may be folded in so that a flat portion of the flap abuts the housing, and in the extended position of the extension mechanism, the flat portion of the flap projects from the contour of the housing. The first antenna and the first antenna feed point may be comprised in the flat portion of the flap. An easy to extend mechanism can thus be obtained, with the antenna being protected inside the flap. The flaps may be spring loaded and may, besides a dipole or a coiled antenna, comprise a patch or PIF (Planar-Inverted F-shaped)—antenna.

According to a further embodiment, the extension mechanism comprises an actuator adapted to receive a control signal and, in accordance with the control signal, bring the extension mechanism from the retracted position into the extended position. Besides a manual operation, an automated operation of the extension mechanism can thus be provided. The actuator may for example comprise an electric motor or a magnetic actuator.

The extension mechanism can be adapted to have a plurality of extended positions, each corresponding to a different distance between the first antenna feed point and the second antenna feed point, with the actuator being adapted to bring the extension mechanism into one of the extended positions in accordance with the control signal. The electronic device may further comprise a controller for controlling the operation of the extension mechanism by providing the control signal to the actuator. The control signal can determine the extended position into which the extension mechanism is to be brought in order to adjust the distance between the first antenna feed point and the second antenna feed point. Such a mechanism can enable the electronic device to adapt to the current conditions of signal reception, as the spatial paths on which signals are received or transmitted can be changed by adjusting the antenna feed point distance.

The controller can be adapted to adjust the distance between the first and the second antenna feed points in dependence on a frequency band in which the electromagnetic signals are to be transmitted and/or received by the antennas so as to enable the communication based on multiple spatial transmission paths. The requirements regarding feed point separation may thus be met for different transmission wavelengths.

The electronic device may further comprise a receiving unit adapted to receive the electromagnetic signals via said first and second antennas and a processing unit adapted to determine a parameter of the communication. The controller may be adapted to adjust the distance between the first antenna feed point and the second antenna feed point in accordance with the determined parameter. The parameter may for example comprise a received signal power, a signal quality indicator, an interference strength indicator, a correlation of the signals received via the first and second antennas or a data rate of the data received during the communication.

The electronic device may also comprise a manually operable control element, such as a key or a software button, that is adapted to provide a control signal to the actuator upon activation of the control element. The actuator can be adapted to bring the extension mechanism from the retracted position into the extended position in response to the control signal.

According to an embodiment, the multiple antenna communication scheme is a spatial multiplexing communication scheme, the extension mechanism being adapted to provide, in the extended position, a distance between the first and second antenna feed points that is large enough to enable a spatial separation of two spatially multiplexed data streams sent or received by the two antennas according to the spatial multiplexing communication scheme. By using a MIMO communication, two or more data streams may thus be transmitted on the same frequency channel, e.g. in a frequency band between 500 MHz and 2.5 GHz.

In another embodiment, the multiple antenna communication scheme is a spatial diversity scheme, the extension mechanism being adapted to provide, in the extended position, a distance between the first and second antenna feed points that is large enough so that the spatial paths via which the electromagnetic signals are received by the first and second antennas are different and have independent signal fading properties. Interference cancellation and received or transmitted signal strengths may thus be improved.

The extension mechanism may be adapted so that the distance between the first and second antenna feed points in the extended position is at least one quarter of a wavelength of the frequency band at which the communication via said two antennas is to occur. This can ensure proper spatial separation both of received and transmitted signals.

By means of the actuator, the extension mechanism can be automatically operated, e.g. for an automated improvement of data throughput, interference cancellation or signal strength. Yet the extension mechanism may also be adapted to be manually operated and moved from the retracted position to the extended position.

In other embodiments, the electronic device may comprise more than two, e.g. four antennas. In such a configuration, at least two antennas may then be mounted to the extension mechanism, so as to enable an enlargement of the distance between their feed points and the feed points of the other antennas. Link quality and reliability as well as data throughput may thus be further increased.

The electronic device may be implemented as a mobile device, such as a mobile phone, a PDA, a mobile TV or a camcorder, a camera, a wireless network adapter, a surf stick, e.g. in form of a USB-stick or a mini-PCI card, or as any other mobile device with integrated wireless data transmission functionality. Yet implementations are not restricted to mobile devices, but may also comprise other, e.g. stationary devices such as wireless routers, base stations, e.g. home base stations, such as a femto base station, and other devices with wireless data transmission functionality.

The feed point of the respective antenna may be located at or adjacent to the point at which the antenna is mounted to the extension mechanism or the housing, for example at the antenna base.

According to another aspect of the present invention, a method of extending an antenna of an electronic device is provided. The electronic device is adapted to perform a wireless communication for a transmission of data and comprises at least a first antenna having a first antenna feed point and a second antenna having a second antenna feed point, the first and second antennas being connected to the electronic device by said first and second antenna feed points, respectively, the antennas being adapted to transmit and receive electromagnetic signals for providing said wireless communication using a multiple antenna communication scheme that is based on multiple spatial transmission paths. The electronic device further comprises an extension mechanism to which at least the first antenna is mounted, the extension mechanism having a retracted position and at least one extended position, wherein in the extended position, the distance between said first antenna feed point and said second antenna feed point is larger than in the retracted position, the extension mechanism further comprising an actuator adapted to receive a control signal and, in accordance with the control signal, bring the extension mechanism from the retracted position into the extended position. The method comprises the steps of supplying a control signal to the actuator and, in response to receiving the control signal at the actuator, operating the actuator to bring the extension mechanism from the retracted position to the extended position.

By using the method to increase the distance between the feed points of the antennas, advantages similar to the ones outlined above may be achieved.

According to an embodiment of the method, the electronic device may further comprise a controller for controlling the operation of said extension mechanism by providing said control signal to said actuator for adjusting the distance between said first antenna feed point and said second antenna feed point.

The method may further comprise the steps of determining a frequency band at which the electronic device is to be operated for performing said wireless communication; determining a minimum distance required for enabling said communication based on multiple spatial transmission paths via said two antennas on said frequency band; and by means of said controller, adjusting the distance between said first antenna feed point and said second antenna feed point to a distance equal to or larger than said minimum distance. The distance may thus be matched to the communication frequency to improve reception/transmission. At some frequencies, e.g. above a threshold frequency, no operation of the extension mechanism may be required.

The method further comprise the steps of performing a communication via at least one of said first and second antennas using a spatial diversity scheme; determining a parameter of said communication; and, by means of said controller, adjusting the distance between said first antenna feed point and said second antenna feed point in order to adjust said parameter. The parameter may comprise at least one of a received signal power, a signal quality indicator, an interference strength indicator, a correlation of the signals received via said first and second antennas, and a data rate of data received during said communication.

The distance between said first antenna feed point and said second antenna feed point may be adjusted so that the spatial paths via which the electromagnetic signals are received by the first and second antennas are different and have independent signal fading properties.

The spatial diversity scheme may comprise a spatial multiplexing communication scheme and the distance between said first antenna feed point and said second antenna feed point may be adjusted so as to enable a spatial separation of two spatially multiplexed data streams sent or received by said two antennas according to the spatial multiplexing communication scheme.

The method may be further implemented with any of the electronic devices mentioned above.

It should be clear that the features of the aspects and embodiments of the present invention mentioned above and explained further below can be used not only in the respective combinations indicated, but also in other combinations or in isolation, without leaving the scope of the present invention.

BRIEF DESCRIPTION OF THE DRAWINGS

The foregoing and other features and advantages of the invention will become further apparent from the following detailed description read in conjunction with the accompanying drawings. In the drawings, like reference numerals refer to like elements.

DETAILED DESCRIPTION

Figure 1:
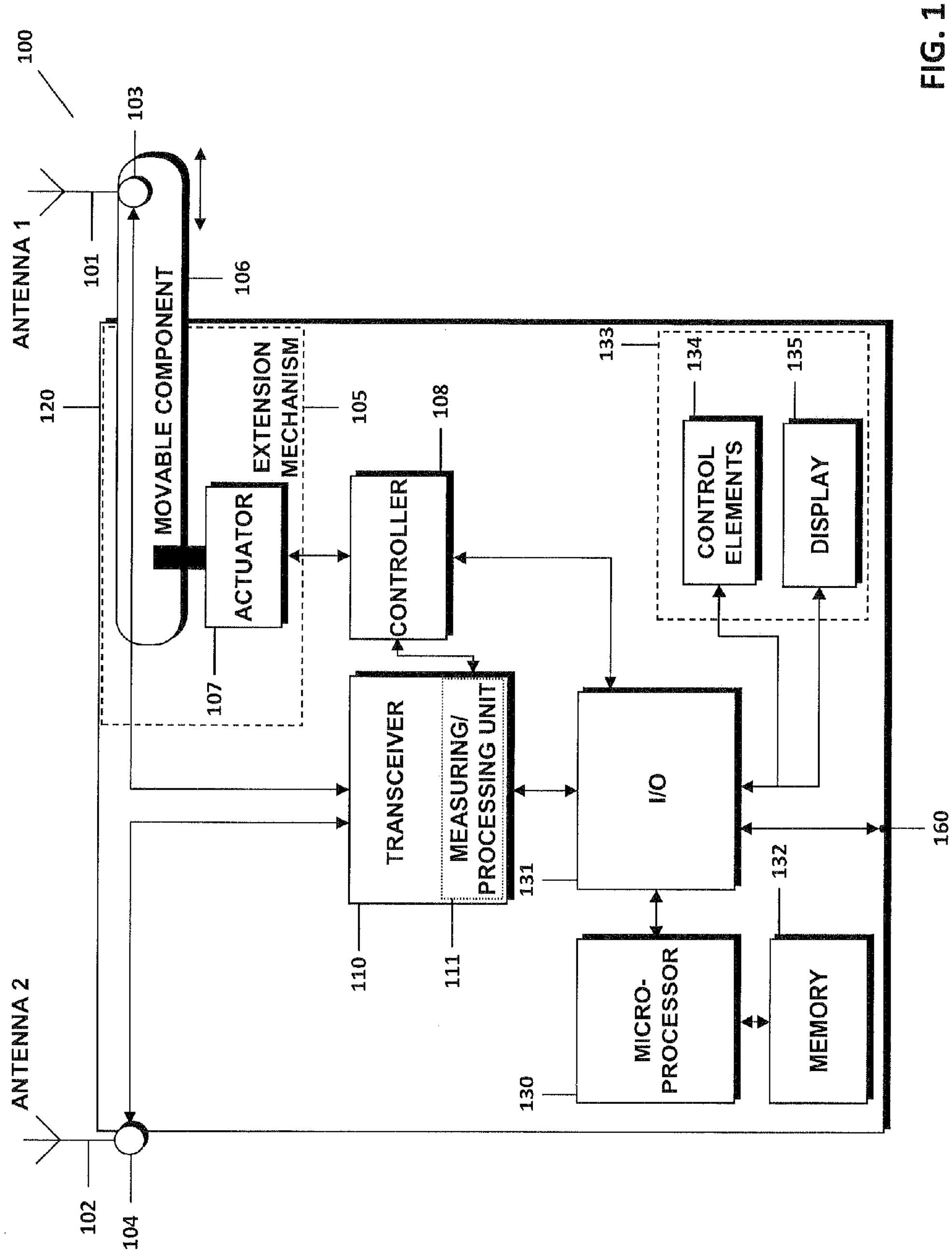
FIG. 1 is a schematic block diagram of an electronic device according to an embodiment of the present invention.

In the following, embodiments of the present invention will be described in detail with reference to the accompanying drawings. It is to be understood that the following description of embodiments is given only for the purpose of illustration and is not to be taken in a limiting sense. The scope of the invention is not intended to be limited neither by the embodiments described hereinafter nor by the drawings, which are taken to be illustrative only, but is intended to be limited only by the appended claims and equivalents thereof. The drawings are to be regarded as being schematic representations only, and elements in the drawings are not necessarily to scale with each other. Any direct connection or coupling between functional blocks shown in the drawings or other physical or functional units, i.e. any connection or coupling without intervening elements, could also be implemented by an indirect connection or coupling, i.e. a connection or coupling with one or more additional intervening elements. The physical or functional blocks or units are not necessarily implemented as physically separate units, but the blocks or units shown or described may be implemented as separate units, circuits, chips or circuit elements, or may as well be implemented in a common circuit, chip, circuit element or unit.

FIG. 1 shows a schematic block diagram of an electronic device 100 according to an embodiment of the present invention. Electronic device 100 is adapted to perform a wireless communication for transferring data, e.g. over a mobile communication network. The device 100 may receive data, e.g. for displaying the data to a user, transmit data which is stored on the device or which is acquired by the device, or may serve as a data transfer device for another electronic device, e.g. as a modem or network device transferring data for a computer.

The electronic device 100 comprises a processing unit in the form of a microprocessor 130 interfacing several components of the electronic device by means of input/output unit 131. The exchange of control signals or data between the components may be achieved by a bus system (not shown). The microprocessor 130 can control the operation of the electronic device 100 according to programs stored in memory 132. Microprocessor 130 may be implemented as a single microprocessor or as multiple microprocessors, in the form of a general purpose or special purpose microprocessor or of one or more digital signal processor or application specific integrated circuits (ASICs). Memory 132 may comprise all forms of memory, such as random access memory (RAM), read only memory (ROM), or other types of volatile or non-volatile memory such as EPROM or EEPROM, flash memory or a hard drive. Some of these types of memory may be removable from the electronic device 100, such as a flash memory card, while others may be integrated for example with microprocessor 130. Memory 132 can store data that is received by means of transceiver 110 or that is to be transmitted by transceiver 110.

Transceiver 110 performs a wireless communication via antenna 101 (first antenna) and antenna 102 (second antenna) with another device. It thus comprises a transmitting and a receiving unit. The communication may be performed via a mobile communication network, such as an LTE (Long Term Evolution) network. It may also be performed via a wireless local area network, a Bluetooth™ type communication with another device, or any other type of wireless communication. As such, transceiver 110 may be implemented as a fully functional cellular radio transceiver or a wireless network transceiver and may work according to any suitable known standard. Via antennas 101 and 102, transceiver 110 can receive data, which is subsequently stored in memory 132 or which is transmitted to another device via data connection 160. Vice versa, data stored in memory 132 or received on data connection 160 can be transmitted to another device by transceiver 110 via antennas 101 and 102.

Electronic device 100 may itself comprise a data source, such as a digital camera unit, which captures data in form of digital images that can be transferred by transceiver 110. On the other hand, data such as a video stream can be received via both antennas and the transceiver 110 and can be given out to a user of electronic device 100 by means of display 135. It should be clear that these are only possible examples of data transfer scenarios, and that electronic device 100 may be adapted to any data transfer application known to the skilled person.

User interface 133 comprises control elements 134 and display 135. By means of user interface 133, a user can operate and control the electronic device 100. User interface 133 may not be provided in an implementation of device 100 that does not require such an interaction, such as a modem or network adapter. Control elements 134 can comprise mechanical buttons or keys, a touch panel and software implemented controls, such as a software button displayed on display 135, which may be a touch screen comprising the touch panel.

Electronic device 100 uses two antennas 101 and 102 for communication, which enables the device 100 to implement an antenna diversity scheme, in particular a spatial diversity scheme employing two or more physically separated antennas. Such a multiple antenna communication scheme can substantially improve the communication capabilities of device 100.

Device 100 can for example be adapted to perform a MIMO (Multiple Input and Multiple Output) communication. In a MIMO setup, another device communicating with electronic device 100 is also provided with two or more physically separated antennas. Among other techniques, such a setup enables spatial multiplexing. In spatial multiplexing, different data streams are transmitted from different transmit antennas in the same frequency channel. If these signals arrive at the receiving antennas with sufficiently different spatial signatures, the receiver can separate these streams. Two or more parallel spatial channels are thus created on the same frequency channel, increasing channel capacity and thus data throughput.

Besides spatial multiplexing, device 100 may implement other techniques for e.g. improving signal strength or interference cancellation. The signal reduction or distortion due to interference experienced at an antenna will largely depend on the spatial position of the antenna. By employing two antennas, the influence of interference can be reduced by a proper combination of the signals of both antennas or by using the antenna providing the better signal for reception. Similarly, the signal strength generally depends on antenna position, so that by the appropriate combination of the signals received on the two antennas, signal strength and quality will improve. When transmitting a signal, the phase of the signal transmitted by the two antennas may be adjusted so as to achieve beam forming, and accordingly improve the transmission strength and quality.

A MIMO communication scheme may accordingly be implemented with pre-coding, spatial multiplexing, diversity coding or spatial diversity. The communication with another device having only one receive or transmit antenna is certainly also possible. In such a setup, a SIMO (Single Input Multiple Output) or MISO (Multiple Input Single Output) scheme may be employed, which will also benefit from the advantages of spatial diversity.

Figure 2:
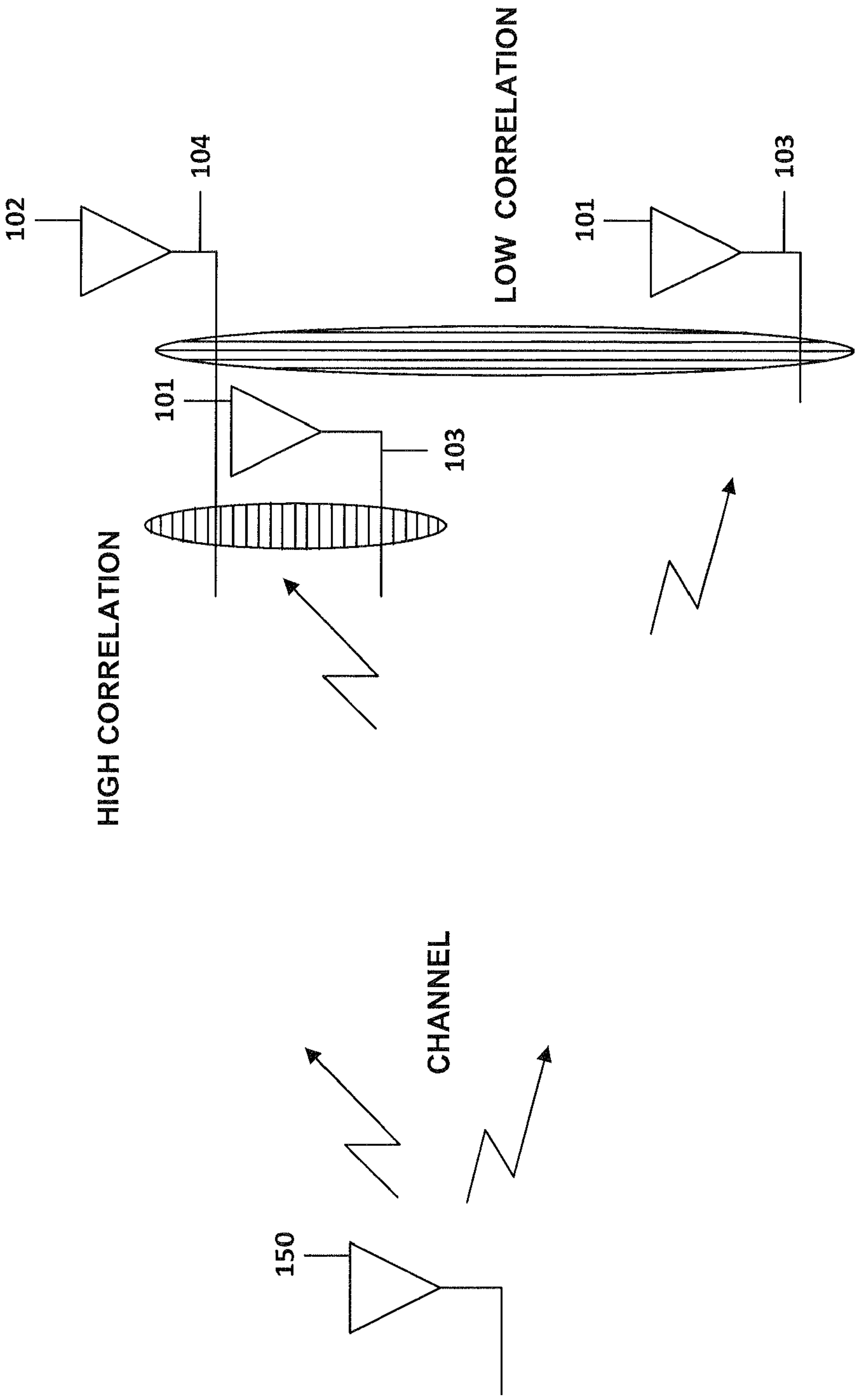
FIG. 2 schematically illustrates the reception of signals at different antenna feed point distances.

For realizing the benefits of such a multiple antenna communication scheme, a minimum spatial separation of the antennas is required. This is illustrated in detail in FIG. 2. In the example of FIG. 2, one or more transmit antennas 150 transmit an electromagnetic signal that is received by the antennas 101 and 102. If the physical separation between the antennas 101 and 102 is small, the received signals are highly correlated. The advantages of antenna diversity can thus no longer be realized, as for example two data streams transmitted on the same frequency channel can no longer be separated. The present invention recognizes that for implementing diversity and MIMO schemes, the antennas 101 and 102 should be separated by at least one quarter wavelength of the frequency at which the communication occurs. With such a spatial separation, the two antennas will deliver uncorrelated signals. In particular, the correlation of the received signals can be decreased by separating the feed points 103 and 104 of the antennas 101 and 102. As the physical separation required depends on the communication frequency, the separation should be larger at lower frequencies. The maximum separation of the antenna feed points 103 and 104 is generally prescribed by the dimension of the housing of the electronic device 100. For small devices communicating at higher frequencies, e.g. above 1.5 GHz, the separation of the antennas provided by the housing may be sufficiently large. For a communication on lower frequency bands, e.g. frequencies below 1 GHz, an appropriate spacing between the antennas can no longer be achieved.

Now turning back to FIG. 1, the present invention overcomes this problem by providing an extension mechanism 105. In the embodiment of FIG. 1, the extension mechanism 105 comprises a movable component 106 to which antenna 101 is mounted. Movable component 106 can be extended from the housing 120 of electronic device 100, so that the physical separation of feed point 103 of antenna 101 and feed point 104 of antenna 102 can be increased. Note that the implementation of the extension mechanism 105 with a movable component 106 that can be extended from housing 120 is only one possibility of increasing the distance between the feed points, other implementations of the extension mechanism that may be used with device 100 are described hereinafter. Extension mechanism 105 can comprise further components, to which antenna 102 can be mounted, or a second extension mechanism may be provided for antenna 102. The first or the additional extension mechanism can be adapted to increase the distance between feed point 104 and the housing 120, and consequently the distance to feed point 103, when operated. By providing the extension mechanism 105, housing 120 can be kept to a small size, while enabling a sufficient separation of feed points 103 and 104 during operation of device 100. A small sized device can thus employ a diversity/MIMO communication scheme even at low frequency bands.

The extension mechanism 105 of device 100 comprises an actuator 107 that can bring the extension mechanism 105 from a retracted position into an extended position by extending the movable component 106. Suitable implementations of actuator 107 comprise an electric motor or a magnetic actuator. Controller 108 provides a control signal to actuator 107 for operating the extension mechanism 105. The controller 108 itself may be software controlled, e.g. by software running on microprocessor 130. Both a fully automated control by the software or a control by user interaction, e.g. via user interface 133, are conceivable. Such software may also evaluate the signals received by transceiver 110 via the two antennas and issue appropriate control commands to controller 108 to adjust the distance between the antennas for optimizing a communication parameter. Such a parameter may for example be data throughput, interference cancellation or received signal strength.

It is also possible to perform an evaluation of the signals received via antennas 101 and 102 by measuring/processing unit 111 which may be part of the transceiver 110. Unit 111 may for example be a channel estimator being part of the transceiver 110. Unit 111 can measure signal strength, signal quality, the strength of interference, signal correlation, data rate/throughput and the like. Other information may be derived by analyzing the data streams received via one or both antennas. One of these measured parameters may then be changed or optimized by adjusting the position of one or both antennas by providing a corresponding control signal to actuator 107 of extension mechanism 105. The data rate may for example be increased.

Besides adjusting the distance between the antenna feed points 103 and 104, further components may be provided for adjusting antenna orientation under control of unit 111. It should be clear that measuring/processing unit 111 may also be implemented as software running on microprocessor 130. In other implementations, controller 108 may be part of unit 111.

Electronic device 100 can thus be operated in a fully automated mode, in which the separation of antennas 101 and 102 is adjusted to decrease signal correlation, increase received signal strength or quality, increase the throughput of transmitted or received data or adjust another communication parameter. Simpler implementations that do not use feedback from signals received over antennas 101 and 102 are also conceivable. The separation of the antennas may simply be determined by the frequency on which the communication occurs. A user of device 100 may adjust the separation by means of a software user interface provided on display 135. The user may enter a command to move the extension mechanism 105 into one of several possible extended positions by means of control elements 134, or move it between only two possible positions (retracted/extended). In a further implementation, device 100 is provided with a key or button that is electrically coupled to controller 108. By actuation of the key, the user can adjust the position of the extension mechanism 105 or simply switch between the extended and retracted positions.

In other embodiments, extension mechanism 105 is operated manually. Accordingly, no actuator 107 and controller 108 need to be provided. A mechanical control element may then be used to operate the extension mechanism 105. Movable component 106 may for example be spring loaded and engage by a locking means when in the retracted position, which is released by a mechanical button, as a result of which the movable component 106 is moved into the extended position. In other implementations, movable component 106 may simply be manually moved between the retracted and extended positions.

As can be seen from the above, the extension mechanism 105 can be realized in a variety of ways which are further detailed hereinafter. Device 100 can be implemented as a mobile phone, a mobile TV, a camcorder, a camera, or another portable device with integrated high data rate functionality. These devices benefit from the high data transfer rates achievable by a MIMO communication scheme while the size of their housings can be kept small. Other implementations include a USB surf-stick, a wireless network adaptor, e.g. in form of a mini-PCI card, a compact wireless router, and the like. For example, a USB-stick which enables a data communication over a mobile communication network generally has a small form factor, which inhibits the use of a MIMO communication scheme. This problem is overcome by the extension mechanism of the present invention. Electronic device 110 can not only be implemented as a mobile device, but also as a stationery device, such as a femto base station or the like. A particular application are devices communicating over an LTE-network. All of the devices mentioned above can be adapted to operate in an LTE network. By making use of the present invention, these devices can then be enabled to use a multiple antenna communication scheme, which can lead to improved signal strength, quality and data throughput.

It should be clear that device 100 may comprise further components common to the devices mentioned above, while other components may not be required. Some implementations may for example not require a microprocessor 130 and a memory 132, while others may not require a user interface 133. Accordingly, the configuration of device 100 can be adapted to the respective application.

Figure 3A:
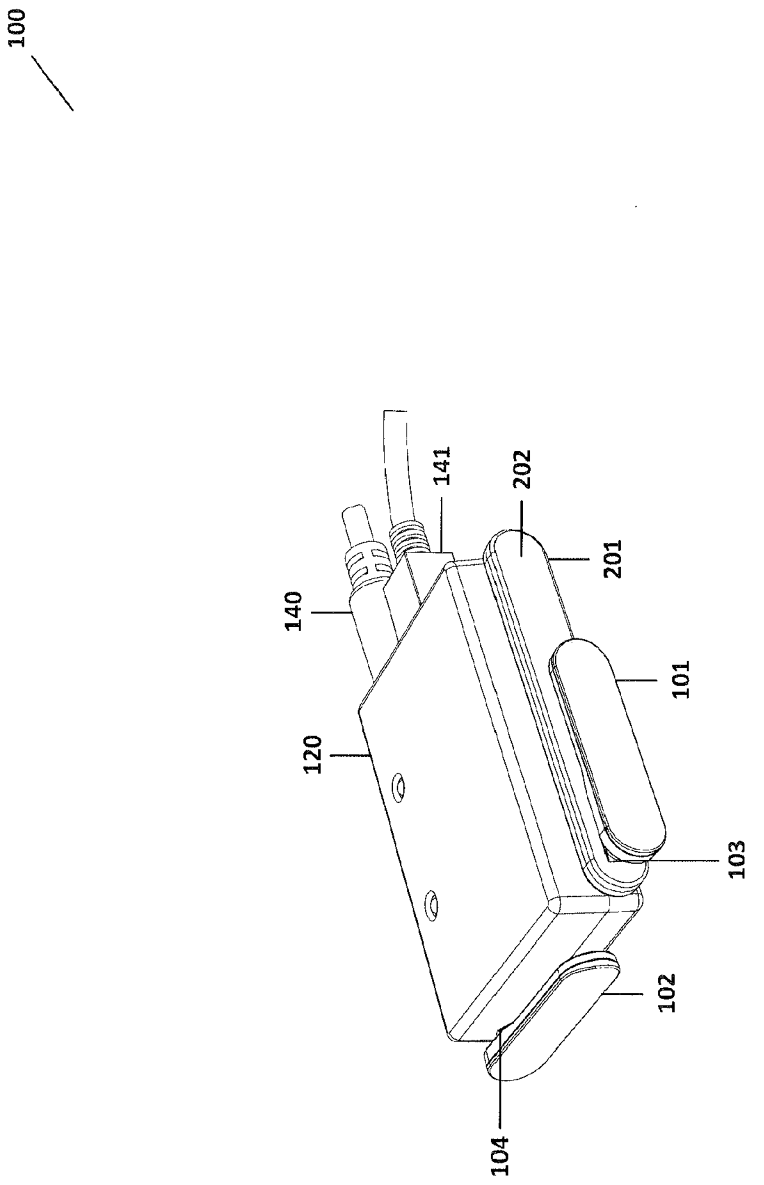
FIGS. 3A to 3C show a schematic representation of an electronic device according to an embodiment of the present invention having a pivotable arm as an extension mechanism.
Figure 3B:
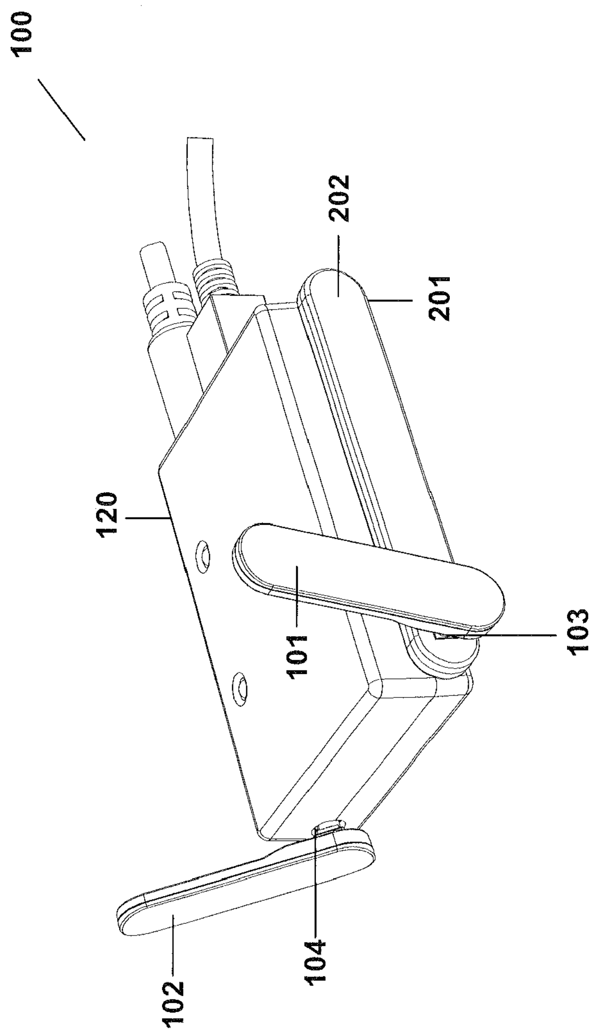
Figure 3C:
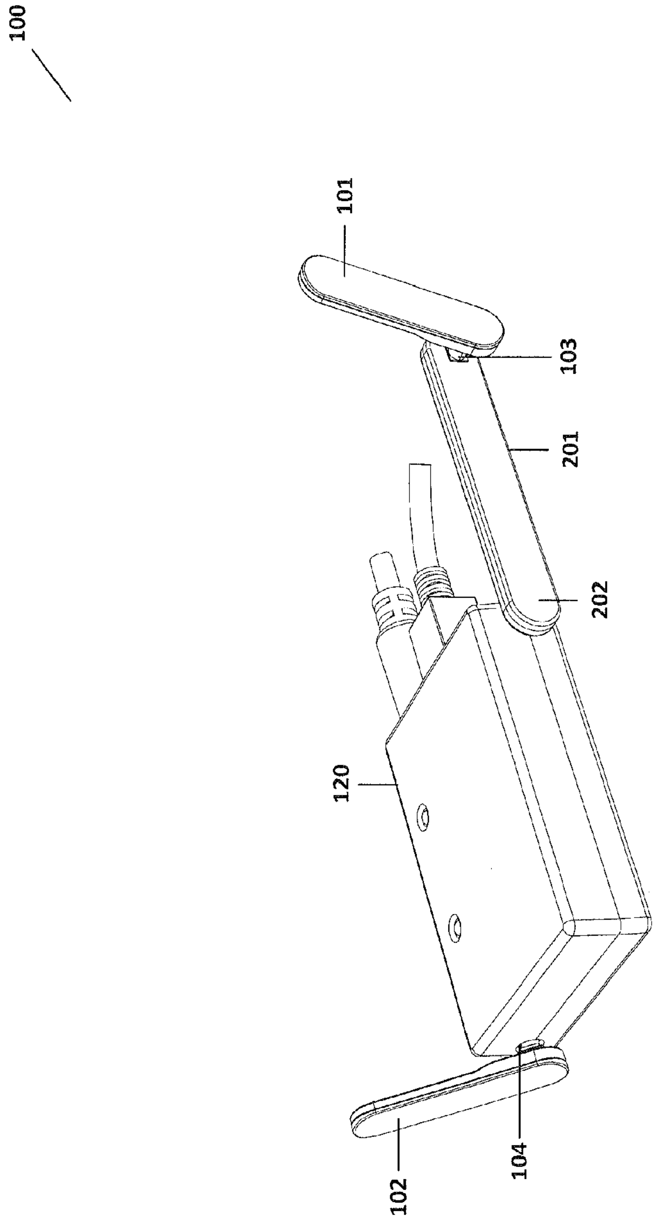

FIGS. 3A to 3C show an implementation of device 100. FIG. 3A shows device 100 with the extension mechanism in the retracted position and antennas 101 and 102 folded in. The extension mechanism comprises a pivotable arm 201 which at a first portion 202 is rotatably connected to housing 120. Antenna 101 is pivotably mounted to a portion of pivotable arm 201 distant to the first portion 202, while antenna 102 is pivotably mounted to housing 120. The feed points 103 and 104 of antennas 101 and 102 are located at or adjacent to the respective mounting points. The feed point is generally the position at which the feed line is connected to the antenna. The feed line connects the antenna with the transceiver or amplifier. The feed point may for example be located at the antenna base at which the antenna is mounted to the electronic device.

Housing 120 is further provided with sockets for receiving power supply connector 140 and data transfer connector 141. In other implementations, electronic device 100 may not comprise sockets, but may comprise a USB-connector, a mini-PCI or PCMCIA connector or other types of connectors or connector sockets. Other implementations may not comprise connectors or sockets at all.

In the configuration of FIG. 3A, device 100 is ready for transport. In FIG. 3B, antennas 101 and 102 are folded out. This configuration is suitable for a communication at high frequencies, where a separation by a short distance of feed points 103 and 104 as shown in FIG. 3B is sufficient. For a communication at lower frequencies, the extension mechanism can be moved to the extended position by folding out lever arm 201. Lever arm 201 is folded out by rotation around the pivot point provided in the first portion 202. The orientation of antenna 101 can then subsequently be adjusted as desired. As can be seen, the distance between feed points 103 and 104 is substantially enlarged. The distance between the feed points exceeds the largest dimension of housing 220, as a result of which a multi antenna communication scheme, such as spatial multiplexing is enabled also at low frequencies, even though housing 120 is compact. Lever arm 201 and antennas 101 and 102 can be operated manually, yet they may also be driven by a spring loaded mechanism in combination with a release mechanism, or may be motor driven.

The lever arm 201 can be fixedly mounted or can be made removable, e.g. so that it can be replaced by antenna 101 itself. It is also possible to replace the lever arm with a lever arm of a different length, colour, design or other characteristics.

Figure 4A:
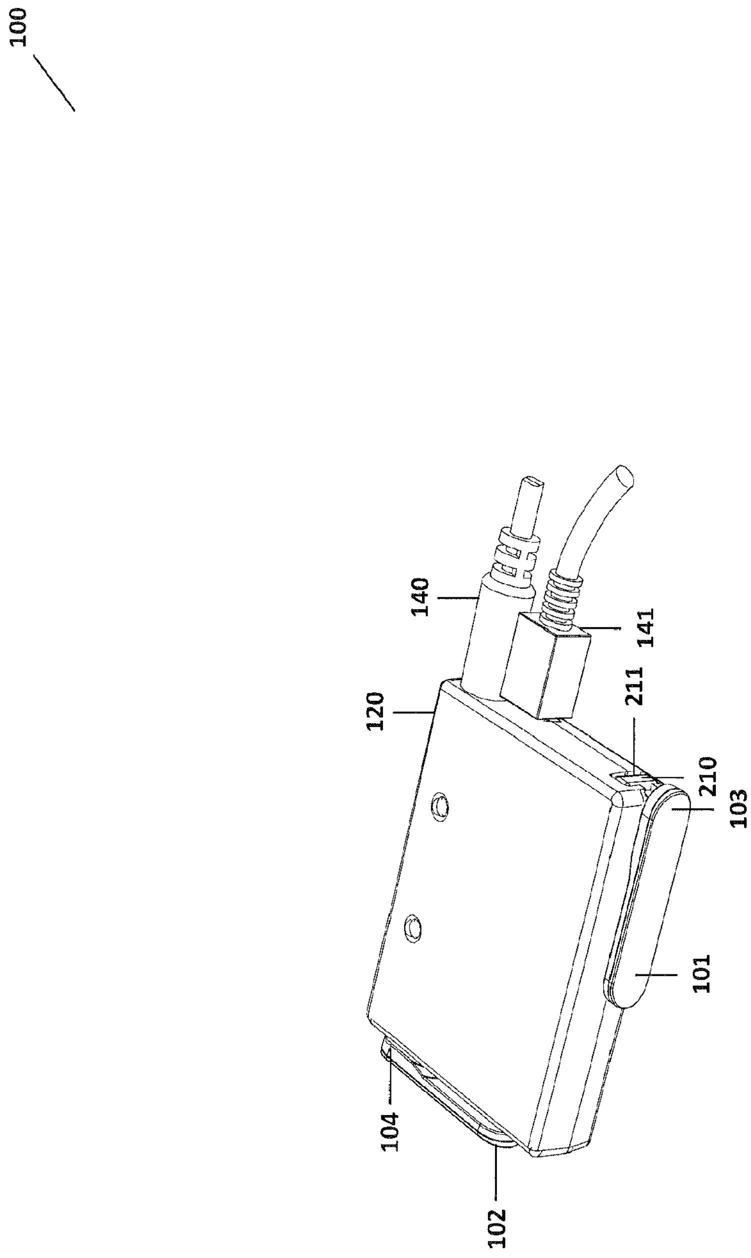
FIGS. 4A to 4C show a schematic representation of an electronic device according to an embodiment of the present invention having a sliding element as an extension mechanism.
Figure 4B:
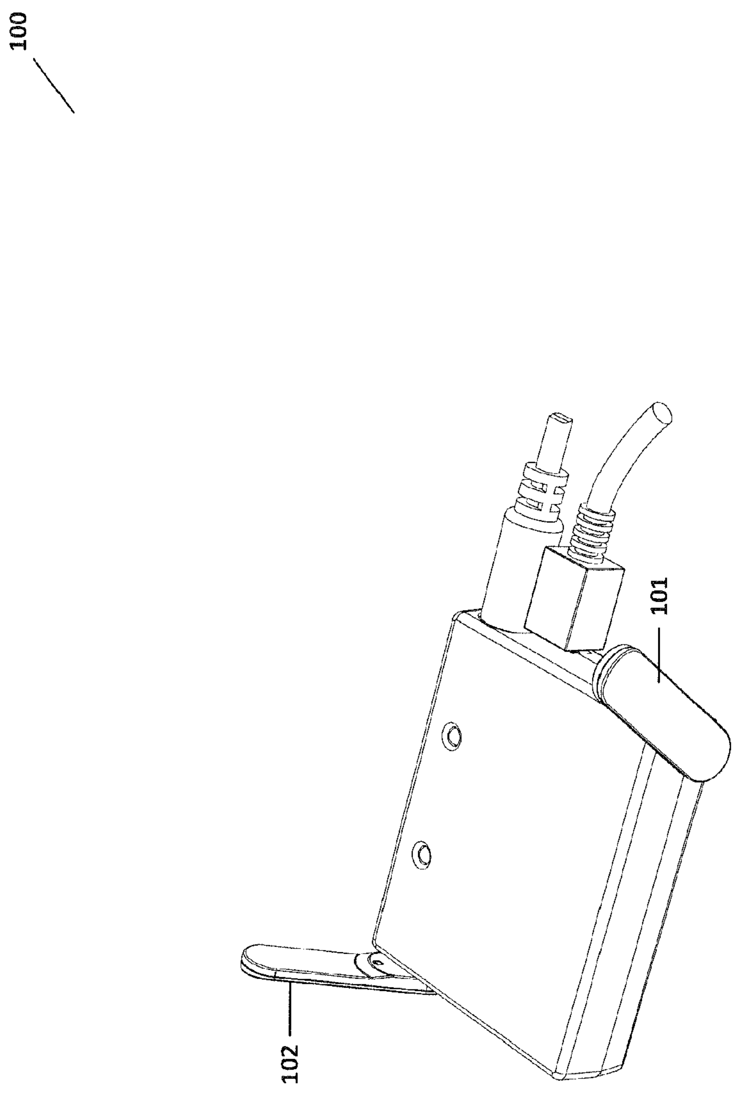
Figure 4C:
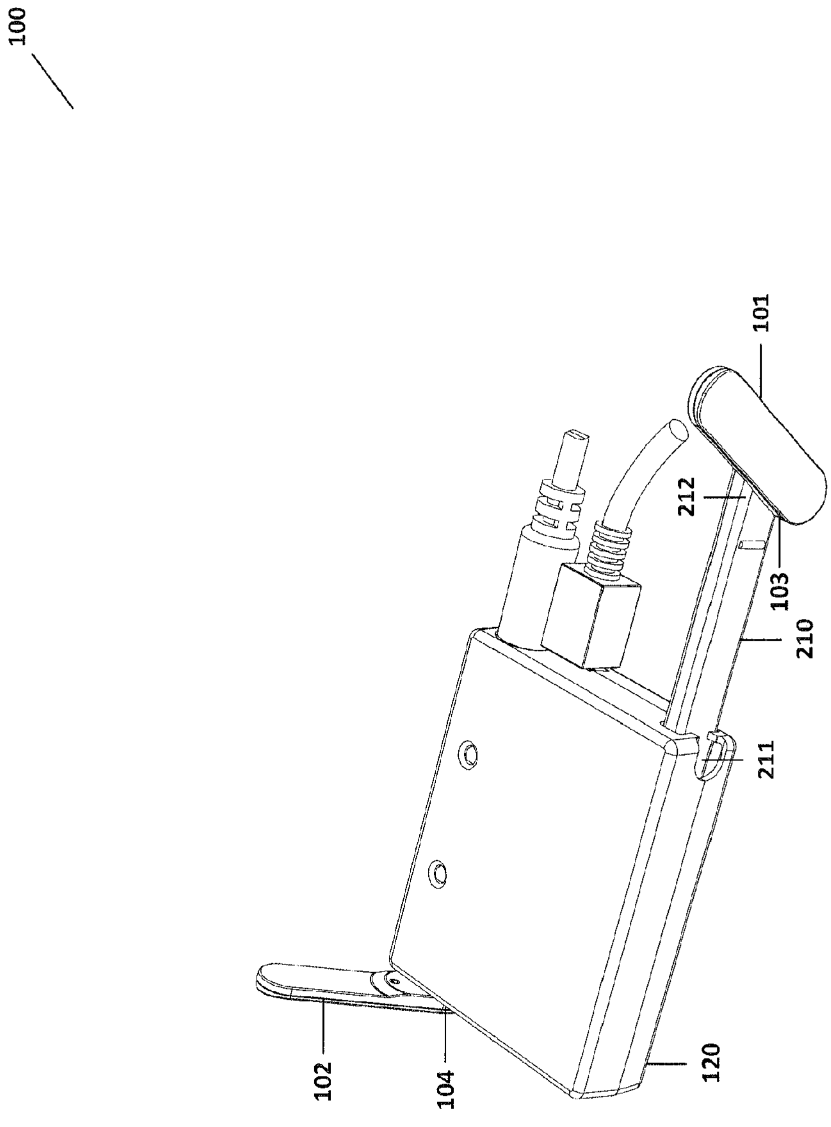

FIGS. 4A to 4C show another implementation of electronic device 100. Antenna 102 is again pivotably mounted to housing 120 of device 100. Antenna 101 is pivotably mounted to the sliding element 210. FIG. 4A shows device 100 with the extension mechanism in the retracted position. The sliding element 210 (or slider) is arranged inside a recess 211 of housing 120. Antennas 101 and 102 are folded in, so that the device is ready for transport.

In FIG. 4B, device 100 is again shown with antennas 101 and 102 folded out for a communication at higher frequency bands. Even though the extension mechanism is still retracted, the distance between the antenna feed points is larger than in the implementation of FIG. 3B.

For a communication and lower frequencies, the slider 210 can be pulled out which increases the distance between the antenna feed points to enable a multi-antenna communication scheme (FIG. 4C). Antenna 101 is mounted to portion 212 of slider 210 that is distant to the housing 120 in the extended position of the extension mechanism. As the sliding element 210 projects from housing 220, a distance between feed points 103 and 104 is provided that is larger than the largest dimension of the housing.

The slider may be manually operated, e.g. by pulling the antenna of extending the mechanism and by pushing the slider in for transport. Other possible implementations include a spring loaded push/pull mechanism (e.g. similar to a biro) or a motor driven operation.

Figure 5A:
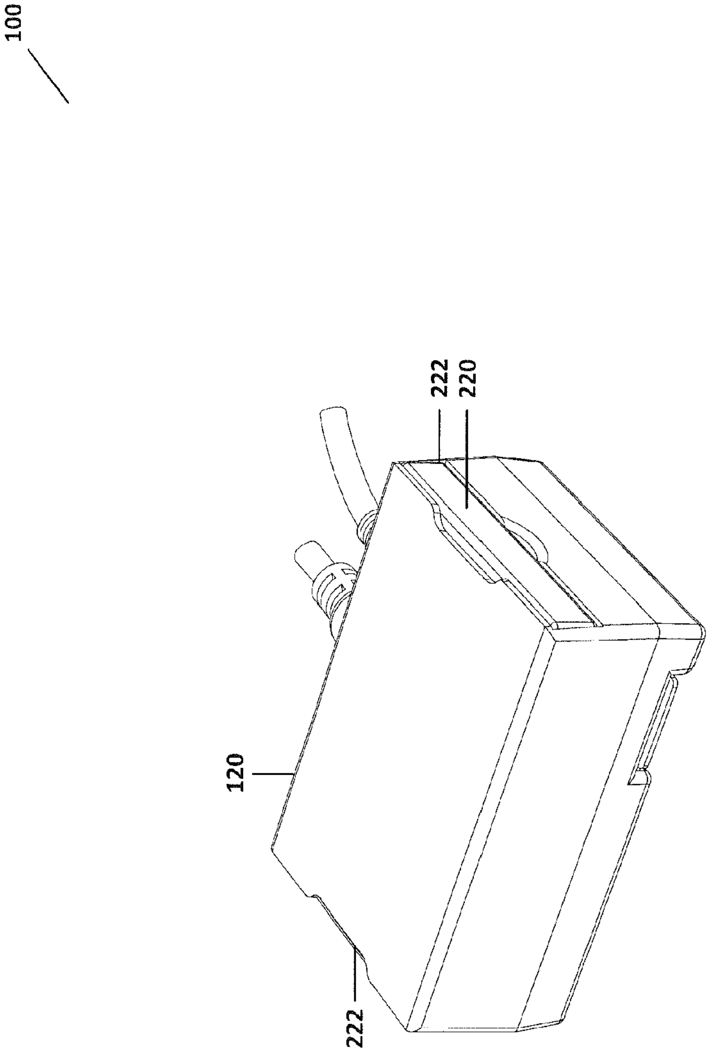
FIGS. 5A and 5B show a schematic illustration of an electronic device according to an embodiment of the present invention having an extension mechanism comprising two sliding elements, in each of which an antenna is arranged.
Figure 5B:
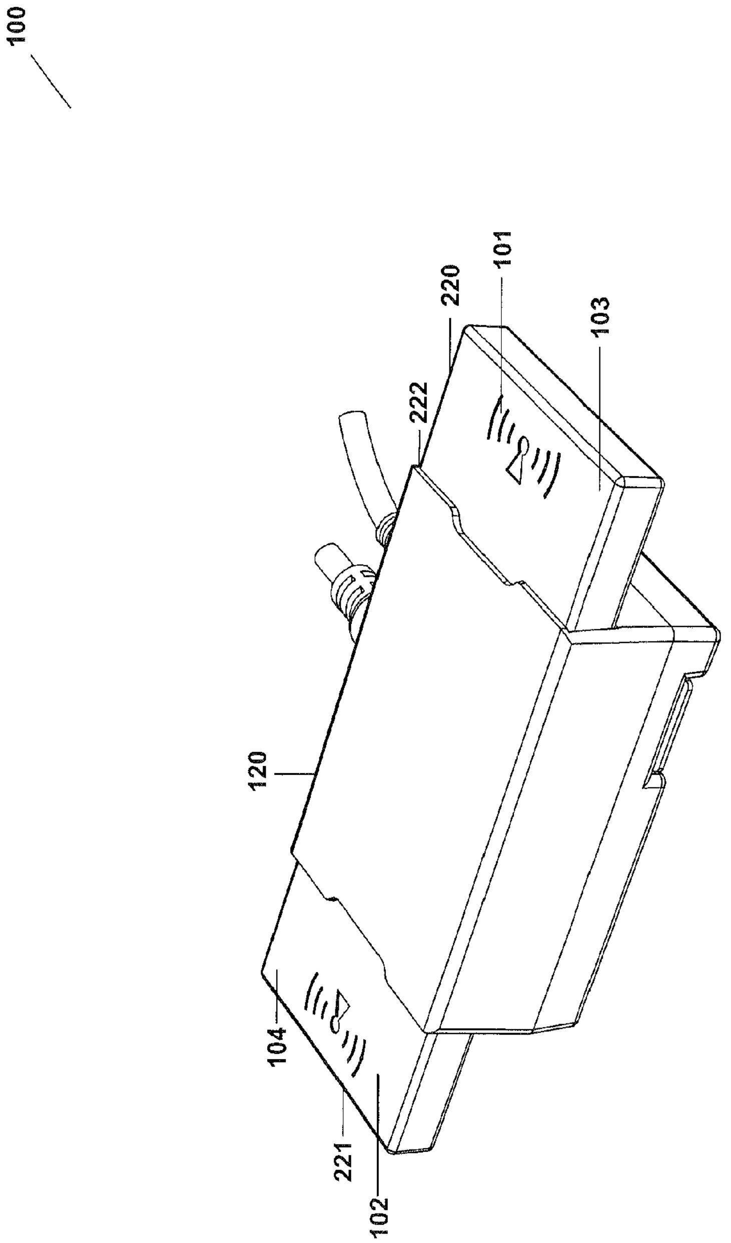

FIGS. 5A and 5B show a further implementation of electronic device 100. The extension mechanism now comprises two sliding elements 220 and 221 that are each arranged in a recess 222 in the retracted position of the extension mechanism (FIG. 5A). A high frequency communication is enabled in the retracted position shown in FIG. 5A, with both antennas being arranged inside the device 100.

For a low frequency operation, the distance between the antennas can be enlarged by pulling out the sliding elements 220 and 221 (FIG. 5B). Antennas 101 and 102 with their respective feed points 103 and 104 are located inside the sliding elements 220 and 221. This configuration is particularly suitable for patch antennas or PIF (Plainar-Inverted-F-shaped) antennas that can be housed inside the sliding elements 220 and 221. In the extended position of the extension mechanism shown in FIG. 5B, the spatial separation of the antenna feed points 103 and 104 is again considerably enlarged.

The sliders can be operated manually by means of a grip or a push/pull mechanism. Again, the sliders may be spring loaded or motor driven and may thus be controlled by software or a user switch. For transport and high frequency use, the sliders and thus the antennas may be simply pushed into the device 100.

Figure 6A:
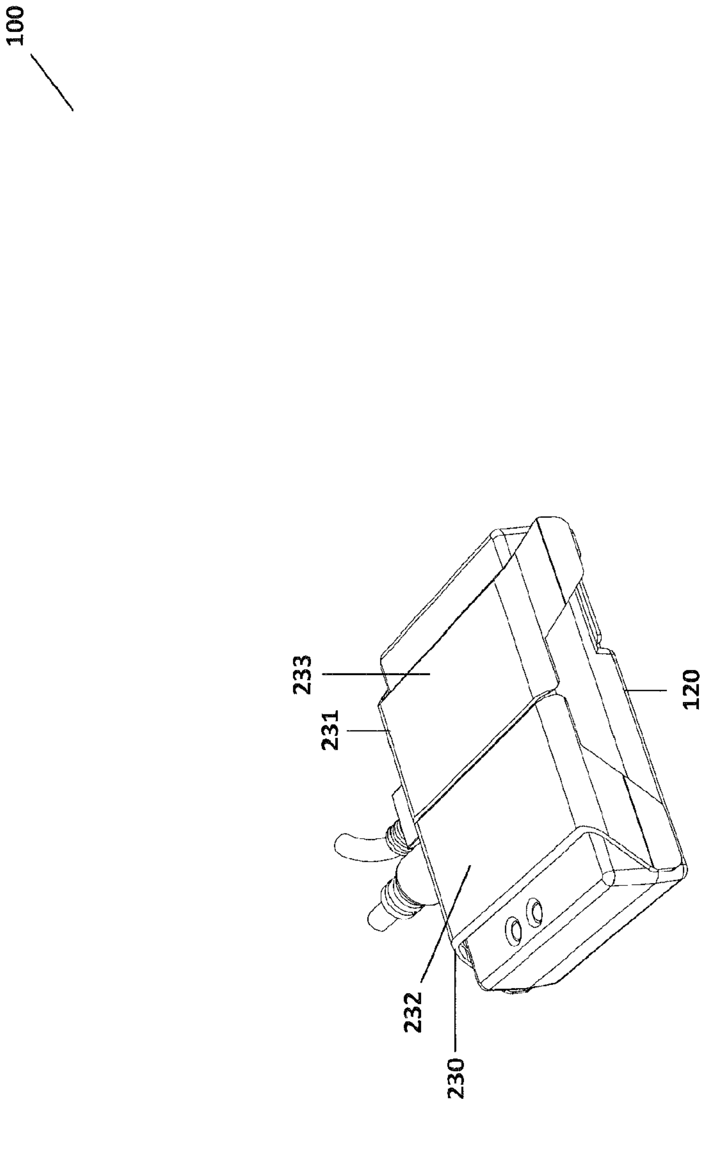
FIGS. 6A and 6B show a schematic illustration of an electronic device according to an embodiment of the present invention having an extension mechanism comprising two flap elements in each of which an antenna is arranged.
Figure 6B:
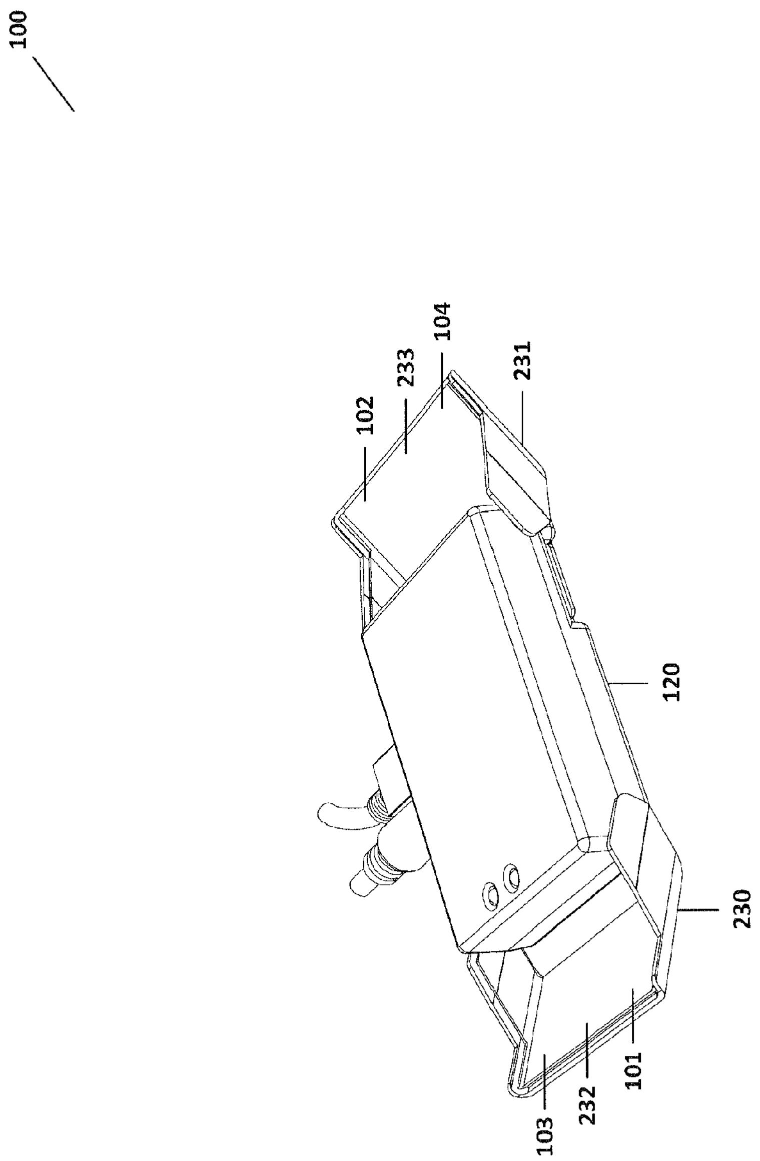

In the implementation of device 100 shown in FIGS. 6A and 6B, the extension mechanism comprises two flaps (or wings) 230 and 231. The flaps 230 and 231 comprise a flat portion 232 and 233, respectively, in each of which an antenna is arranged. In the retracted position shown in FIG. 6A, the flaps are folded in so that the flat portions 232 and 233 abut the housing 120 of device 100. The folded-in position is suitable for transport and high frequency communication.

For low frequency communication, flaps 230 and 231 are folded out as shown in FIG. 6B. In the extended position of the extension mechanism shown in FIG. 6B, antenna feed points 103 and 104 are again further separated than in the retracted position. As antennas 101 and 102 are arranged flaps 230 and 231, respectively, they may again be configured as patch or PIF antennas, yet they may also be rod or folded loop antennas. Also in this configuration, the flaps or wings comprising the antennas may be operated manually or may be spring loaded and released by a release mechanism, e.g. controlled by a user button or by software control. They may also be motor driven.

Figure 7:
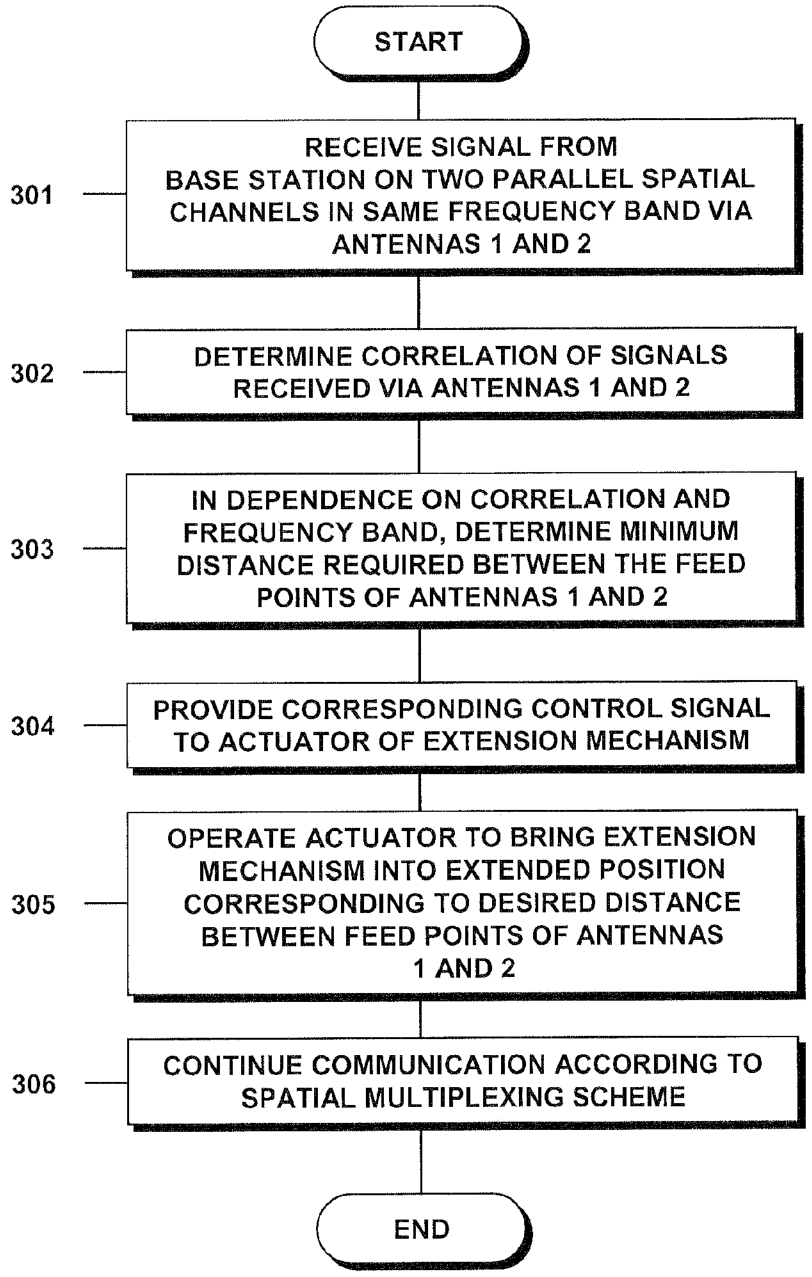
FIG. 7 shows a flow-diagram of a method according to an embodiment of the present invention.

FIG. 7 shows a flow-diagram illustrating a method according to an embodiment of the present invention that may be implemented in the electric device 100. FIG. 7 illustrates a multiple antenna communication scheme in form of spatial multiplexing, that may for example be performed in an LTE network. In step 301, signals are received from a base station on two parallel spatial channels in the same frequency band via antennas 1 and 2. In step 302, a correlation of the signals received via antennas 1 and 2 is determined. If the correlation is too high, the different spatial channels cannot be separated. Accordingly, in dependence on the correlation and the frequency band used for the communication, the minimum distance required between the feed points of antennas 1 and 2 is determined in step 303. The minimum distance ensures that the spatial channels can be separated (see FIG. 2). In order to provide the required separation between the antennas, a corresponding control signal is provided to the actuator of the extension mechanism in step 304. With the control signal, the actuator is operated to bring the extension mechanism into the extended position corresponding to the desired distance between the feed points of antennas 1 and 2 (step 305). The communication according to the spatial multiplexing scheme is started or continued in step 306.

As an example, the actuator may be controlled by a channel estimator, which can be part of the transceiver of device 100. In one operation mode, the spatial separation of the antennas may be controlled so as to improve the data throughput. This can be based on a channel matrix (H) calculated in the channel estimator as follows:

$$H = \begin{pmatrix} h_{11} & h_{12} \\ h_{21} & h_{22} \end{pmatrix} \quad (1)$$

This is the channel matrix for a 2×2 MIMO system. Based on a singular eigenvalue decomposition of this matrix, two separated data streams can be extracted (MIMO). By adjusting the antenna position, the eigenvalues of the matrix can be changed in such a way that the data rate can be improved.

Figure 8:
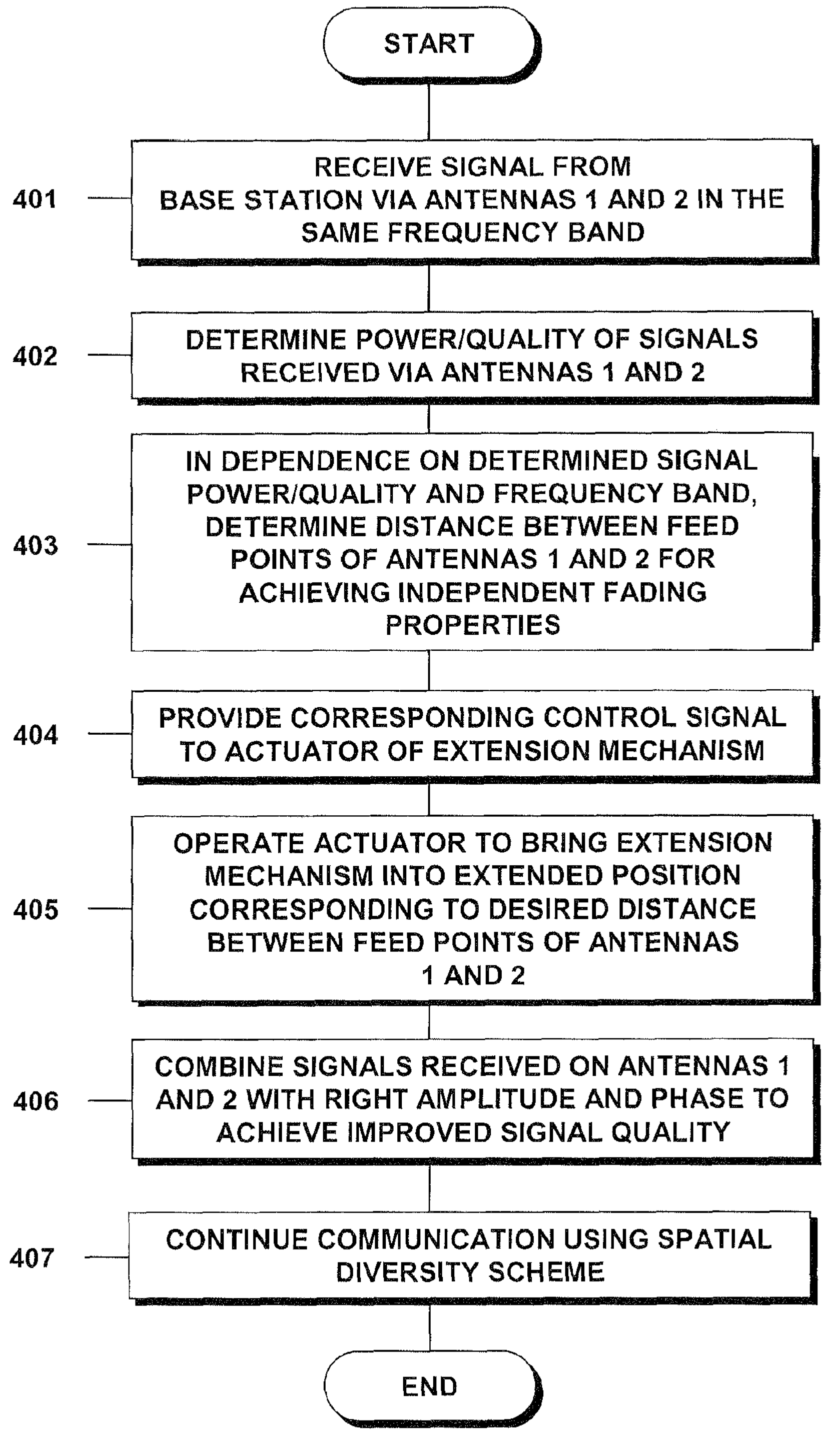
FIG. 8 shows a flow-diagram of a method according to an embodiment of the present invention.

FIG. 8 shows a flow-diagram of a method according to another embodiment of the present invention, which may be implemented in device 100 and which can also be combined with the method shown in FIG. 7. In a first step 401, a signal from a base station is received via antennas 1 and 2 in the same frequency band. The signal may be emitted by only one or by two or more antennas. In step 402, the power and/or quality of the signals received via antennas 1 and 2 is determined. In dependence on the determined signal power/quality and the frequency band used for communication, a distance between the feed points of antennas 1 and 2 is determined with which independent signal fading properties are achieved (step 403).

A corresponding control signal is then provided to the actuator of the extension mechanism (step 404). The control signal operates the actuator to bring the extension mechanism into the extended position corresponding to the desired distance between the feed points of antennas 1 and 2 (step 405). The signals received on antennas 1 and 2 are then combined with the right amplitude and phase to achieve an improved signal quality (step 406). As the signals from two antennas with independent fading properties are used, signal quality and/or strength can be increased. In step 407, the communication is started or continued using the multiple antenna communication scheme in form of the spatial diversity scheme.

Again, the distance between the antenna feed points may be dynamically adjusted for improving a communication parameter during operation. As an example, interferer cancellation may be improved. In presence of an interference signal, the antenna position may be changed in a way to reduce the influence of the interfering signal. The adjustment of the antenna feed point distance can be run on top of available interference cancellation algorithms or may be part of such an algorithm. More than one degree of freedom may be used for improving the interferer cancellation.

Another example can be the dynamic improvement of signal strength. The received signal may be weak and accordingly, the data rate may be limited because of a low signal-to-noise ratio at the antenna position. The antenna position may thus be changed to improve the signal strength of the received signal. Due to spatial diversity, the signal strength will generally change at another antenna position. Operation of the extension mechanism to reposition the antenna feed point can thus improve signal strength. Similar to the methods mentioned above, this can be dynamically performed, e.g. by using a feed back algorithm based on the received signal. This method is particularly advantageous for high frequency bands, due to the larger changes of signal strength with distance, yet it will also show improvements for low frequency bands. For example, at low frequency bands, the antennas may be so closed to each other that the radiation pattern of each antenna can change and increase the signal strength.

The features of the embodiments described above can be combined. The antennas of the electronic device according to the above embodiments may be implemented as different antenna types, such as a rod or dipole antenna, a patch antenna, a PIF antenna, a folded loop antenna and the like. The movable component 106 of the device 100 may be implemented as described with respect to FIGS. 3 to 6, e.g. as a lever arm, a sliding element, a flap or the like. In all embodiments, the feed point distance may be dynamically adjusted, e.g. between different extended positions of the extension mechanism, yet it may also be simply adjusted between two distinct positions (extended and retracted). While FIGS. 3 to 6 show implementations of device 100 in form of a small modem or network device, it should be clear that similar configurations are possible for all of the devices mentioned above, such as a cellular phone, a PDA, a digital camera, and the like.

The present invention enables the realization of small electronic devices, such as mobile or stationery devices, that are capable of a spatial diversity or spatial multiplexing communication with an antenna system supporting low and high frequency bands. The invention can be implemented with a variety of antenna types. The housing of the electronic device can be adapted to the size required by the electrical circuit, it does not need to be enlarged to achieve a sufficient separation between the antenna feed points. As a result of the extension mechanism providing an integrated and adjustable antenna, the device is easy to use and carry.

The invention claimed is:

1. An electronic device adapted to perform a wireless communication for a transmission of data, the electronic device comprising:

a housing for the electronic device having a recess provided therein;

at least a first antenna having a first antenna feed point and a second antenna having a second antenna feed point; the first and second antennas connected to the electronic device by the first and second antenna feed points, respectively; the first and second antennas configured to transmit and receive electromagnetic signals for providing the wireless communication using a multiple antenna communication scheme that is based on multiple spatial transmission paths;

an extension mechanism to which at least the first antenna is mounted; the extension mechanism having a retracted position and at least one extended position; wherein a distance between the first antenna feed point and the second antenna feed point is larger in the extended position than in the retracted position; the extension mechanism comprising a sliding element slidably arranged in the recess of the housing;

wherein, in the retracted position of the extension mechanism, the sliding element is substantially arranged inside the housing;

wherein, in the extended position of the extension mechanism, the sliding element projects from a contour of the housing;

wherein the extension mechanism is configured to have a plurality of extended positions each corresponding to a different distance between the first antenna feed point and the second antenna feed point; the plurality of extended positions including a first extended position;

wherein the extension mechanism comprises an actuator configured to receive a control signal and, in accordance with the control signal, bring the extension mechanism from the retracted position into the first extended position;

a controller configured to control operation of the extension mechanism by providing the control signal to the actuator; wherein the control signal determines the first extended position into which the extension mechanism is to be brought in order to adjust the distance between the first antenna feed point and the second antenna feed point.

2. The electronic device of claim 1, wherein the second antenna is mounted to one of:

the extension mechanism;

a second extension mechanism;

a housing of the electronic device.

3. The electronic device of claim 1:

wherein the extension mechanism comprises a movable component having a portion towards which the first antenna is mounted;

the extension mechanism configured so that:

in the retracted position, the movable component is located in a position in which the portion is arranged adjacent to or inside the housing; and in the first extended position, the movable component is located in a position in which the portion is arranged in a larger distance to the housing than in the retracted position.

4. The electronic device of claim 1, wherein, in the first extended position, the distance between the first and second antenna feed points is larger than a largest dimension of the housing of the electronic device.

5. The electronic device of claim 1, wherein, in the first extended position, the distance between the first and second antenna feed points is larger than 5 cm.

6. The electronic device of claim 1, wherein the first antenna is pivotably mounted to the extension mechanism.

7. The electronic device of claim 1, wherein the first antenna is arranged inside a movable component of the extension mechanism.

8. The electronic device of claim 1, wherein the first antenna is mounted to a portion of the sliding element that is, in the extended position, distant to the housing.

9. The electronic device of claim 1, wherein the first antenna and the first antenna feed point are arranged inside the sliding element.

10. The electronic device of claim 1, wherein the actuator comprises at least one of an electric motor and a magnetic actuator.

11. The electronic device of claim 1, wherein the controller is configured to adjust the distance between the first and the second antenna feed points in dependence on a frequency band in which the electromagnetic signals are to be transmitted and/or received by the first and second antennas.

12. The electronic device of claim 1:

further comprising a receiving unit configured to receive the electromagnetic signals via the first and second antennas;

further comprising a processing unit configured to determine a parameter of the communication;

wherein the controller is configured to adjust the distance between the first antenna feed point and the second antenna feed point based on the determined parameter.

13. The electronic device of claim 12, wherein the parameter comprises at least one of:

a received signal power;

a signal quality indicator;

an interference strength indicator;

a correlation of the signals received via the first and second antennas; and a data rate of data received during the communication.

14. The electronic device of claim 1:

wherein the multiple antenna communication scheme is a spatial multiplexing communication scheme;

wherein the extension mechanism is configured to provide, in the first extended position, a distance between the first and second antenna feed points that is large enough to enable a spatial separation of two spatially multiplexed data streams sent or received by the two antennas according to the spatial multiplexing communication scheme.

15. The electronic device of claim 1:

wherein the multiple antenna communication scheme is a spatial diversity scheme;

wherein the extension mechanism is configured to provide, in the first extended position, a distance between the first and second antenna feed points that is large enough so that the spatial paths via which the electromagnetic signals are received by the first and second antennas are different and have independent signal fading properties.

16. The electronic device of claim 1, wherein the extension mechanism is configured so that the distance between the first and second antenna feed points in the first extended position is at least one quarter of a wavelength of the frequency band at which the communication via the two antennas is to occur.

* * * * *